United States Patent
Hori et al.

(10) Patent No.: US 12,417,600 B2
(45) Date of Patent: Sep. 16, 2025

(54) TERMINAL APPARATUS, METHOD OF OPERATING TERMINAL APPARATUS, AND SYSTEM

(71) Applicant: TOYOTA JIDOSHA KABUSHIKI KAISHA, Toyota (JP)

(72) Inventors: Tatsuro Hori, Tokyo-to (JP); Mina Funazukuri, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 18/064,556

(22) Filed: Dec. 12, 2022

(65) Prior Publication Data

US 2023/0186581 A1    Jun. 15, 2023

(30) Foreign Application Priority Data

Dec. 14, 2021    (JP) ................................. 2021-202842

(51) Int. Cl.
G06T 19/20    (2011.01)

(52) U.S. Cl.
CPC .................................... *G06T 19/20* (2013.01)

(58) Field of Classification Search
CPC ............. G06T 2219/2021; G06T 12/20; G06T 2210/36; H04N 7/157
See application file for complete search history.

(56) References Cited

U.S. PATENT DOCUMENTS

| | | | | |
|---|---|---|---|---|
| 5,894,308 | A * | 4/1999 | Isaacs | G06T 17/20 |
| | | | | 345/420 |
| 11,055,911 | B1* | 7/2021 | Padovani | G06T 13/40 |
| 11,557,093 | B1* | 1/2023 | Terrano | A63F 13/26 |
| 12,073,501 | B1* | 8/2024 | Nagy | G06T 19/20 |
| 2003/0032483 | A1 | 2/2003 | Mifune et al. | |
| 2013/0106985 | A1 | 5/2013 | Tandon et al. | |
| 2018/0300926 | A1 | 10/2018 | Inomata et al. | |
| 2021/0209845 | A1* | 7/2021 | Shepherd | B33Y 50/02 |
| 2021/0360199 | A1* | 11/2021 | Oz | G06T 7/70 |
| 2021/0383617 | A1* | 12/2021 | Sugano | H04N 21/8153 |
| 2021/0385263 | A1* | 12/2021 | Churchill | G06F 3/0482 |
| 2022/0068007 | A1* | 3/2022 | Lafer | G06T 7/50 |

FOREIGN PATENT DOCUMENTS

| | | | |
|---|---|---|---|
| CN | 102970151 A | | 3/2013 |
| JP | 1-278160 A | | 11/1989 |
| JP | 8-331534 A | | 12/1996 |
| JP | 10-93942 A | | 4/1998 |
| JP | 2001325202 A | * | 11/2001 |

(Continued)

*Primary Examiner* — William A Beutel
*Assistant Examiner* — Chris Alejandro Puntier
(74) *Attorney, Agent, or Firm* — Sughrue Mion, PLLC

(57) ABSTRACT

A terminal apparatus includes a communication interface and a controller configured to communicate using the communication interface. The controller receives, from another terminal apparatus, information for generating a 3D model that represents a participant who participates in an event in a virtual space using the other terminal apparatus, generates the 3D model in a form corresponding to a role of the participant in the event, and outputs information for displaying an image obtained by rendering the virtual space in which the 3D model is arranged.

18 Claims, 13 Drawing Sheets

(56) References Cited

FOREIGN PATENT DOCUMENTS

| | | | |
|---|---|---|---|
| JP | 2013-153411 A | 8/2013 | |
| JP | 2014-220649 A | 11/2014 | |
| JP | 6179834 B1 | 7/2017 | |
| JP | 2018-124665 A | 8/2018 | |
| WO | 96/034364 A1 | 10/1996 | |
| WO | WO-2021229415 A1 * | 11/2021 | .............. G06F 3/011 |

* cited by examiner

FIG. 4

| EVENT TYPE | ROLE | DEGREE OF IMPORTANCE |
|---|---|---|
| DISCUSSION | MODERATOR | MEDIUM |
| | TEAM REPRESENTATIVE | HIGH |
| | TEAM MEMBER | LOW |
| PRESENTATION | PRESENTER | HIGH |
| | MC | MEDIUM |
| | AUDIENCE | LOW |
| ENTERTAINMENT | HOST | HIGH |
| | ASSISTANT | LOW |
| | GUEST | MEDIUM |

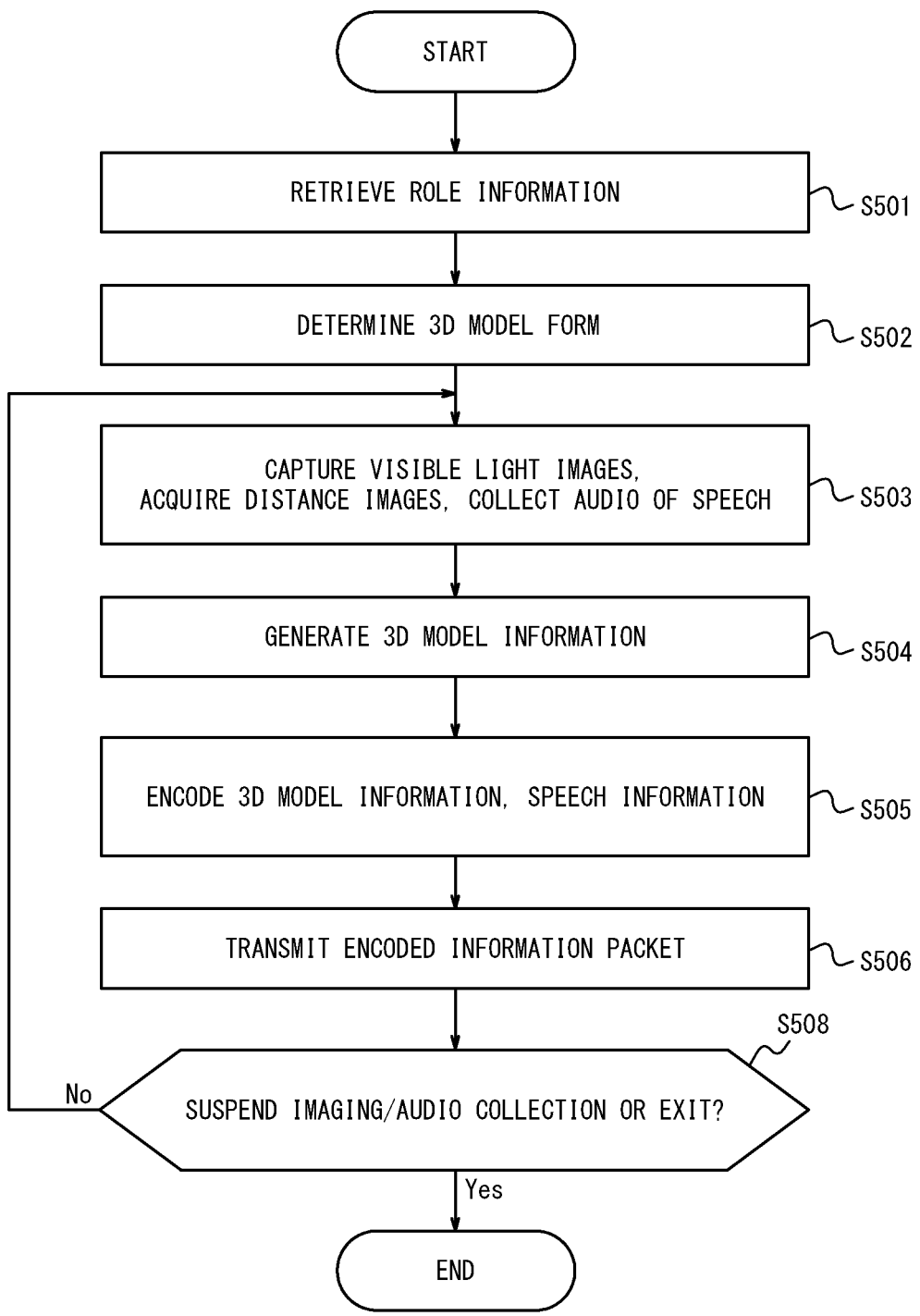

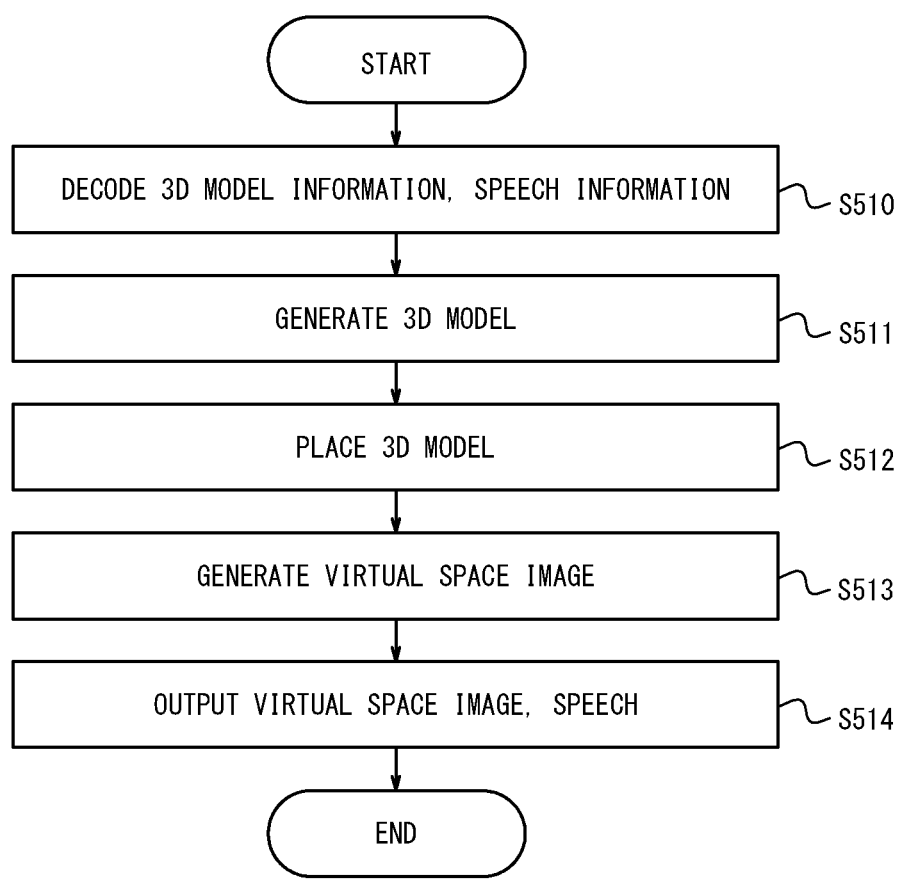

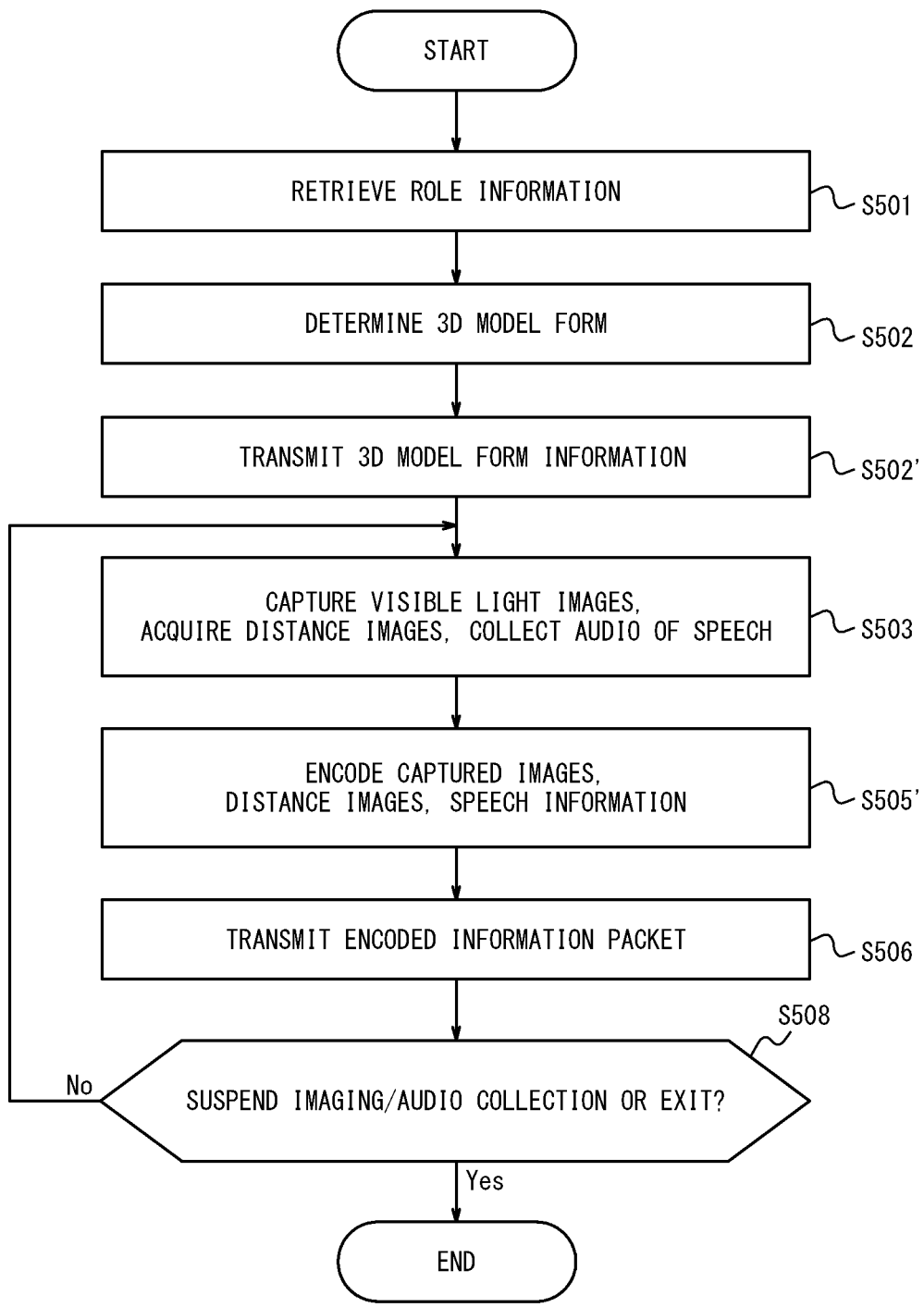

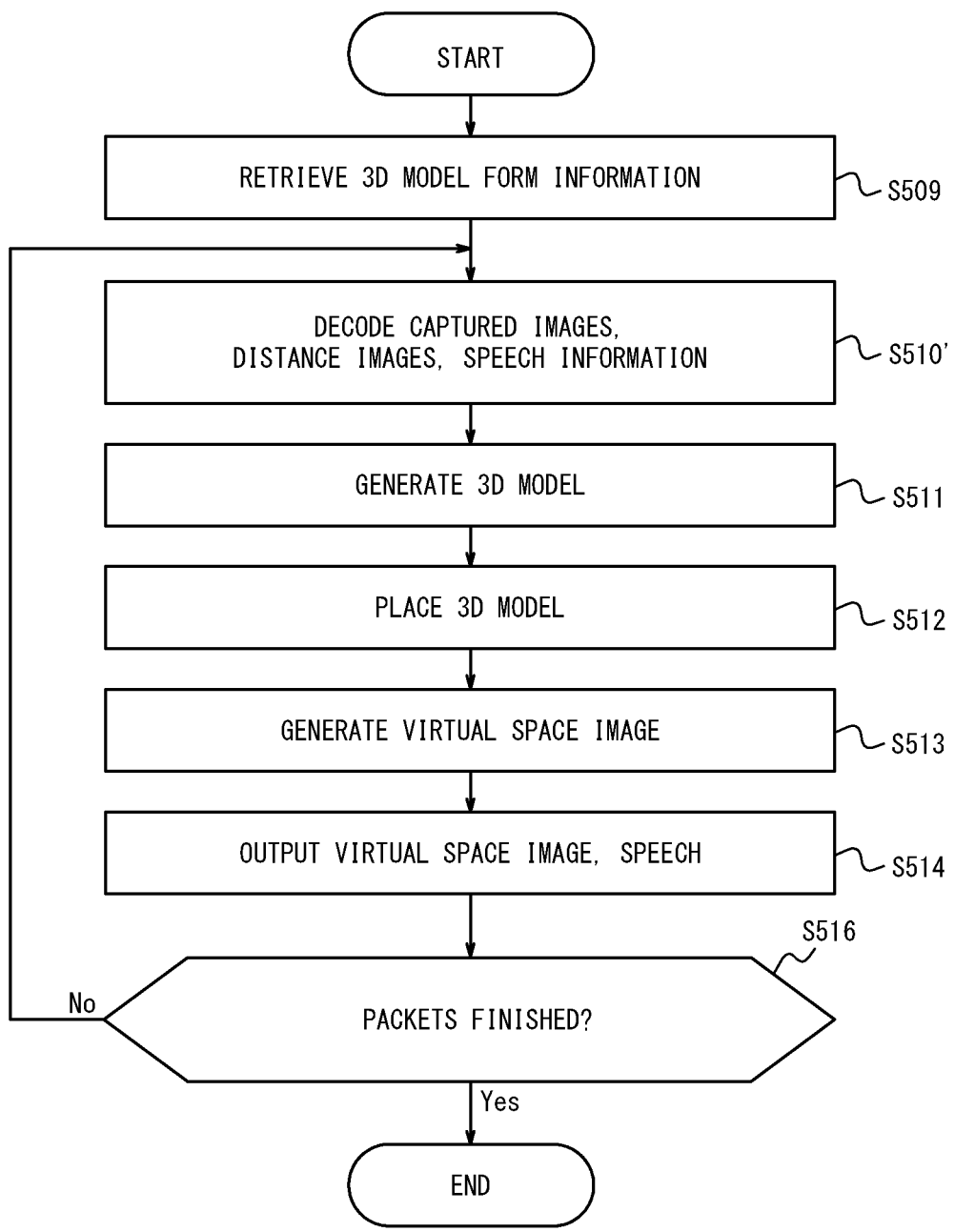

TERMINAL APPARATUS, METHOD OF OPERATING TERMINAL APPARATUS, AND SYSTEM

CROSS-REFERENCE TO RELATED APPLICATION

This application claims priority to Japanese Patent Application No. 2021-202842, filed on Dec. 14, 2021, the entire contents of which are incorporated herein by reference.

TECHNICAL FIELD

The present disclosure relates to a terminal apparatus, a method of operating a terminal apparatus, and a system.

BACKGROUND

A method is known for computers at multiple points to communicate via a network and hold meetings in a virtual space on the network. Various forms of technology have been proposed to improve the convenience of participants in such meetings on the network. For example, Patent Literature (PTL) 1 discloses a system that distinguishes between the image of a participant who has the right to speak and the images of other participants among the images of meeting participants displayed on each computer.

CITATION LIST

Patent Literature

PTL 1: JP H8-331534 A

SUMMARY

There is room for improvement in the convenience for participants in events in a virtual space on the network.

It would be helpful to provide a terminal apparatus and the like that contribute to the convenience for participants in events in a virtual space.

A terminal apparatus according to the present disclosure includes:
  a communication interface; and
  a controller configured to communicate using the communication interface, wherein
  the controller receives, from another terminal apparatus, information for generating a 3D model that represents a participant who participates in an event in a virtual space using the other terminal apparatus, generates the 3D model in a form corresponding to a role of the participant in the event, and outputs information for displaying an image obtained by rendering the virtual space in which the 3D model is arranged.

A method, according to the present disclosure, of operating a terminal apparatus is a method of operating a terminal apparatus including a communication interface and a controller configured to communicate using the communication interface, the method including:
  receiving, by the controller, from another terminal apparatus, information for generating a 3D model that represents a participant who participates in an event in a virtual space using the other terminal apparatus, generating the 3D model in a form corresponding to a role of the participant in the event, and outputting information for displaying an image obtained by rendering the virtual space in which the 3D model is arranged.

A system according to the present disclosure includes a plurality of terminal apparatuses configured to communicate via a server apparatus, wherein
  a first terminal apparatus transmits, to a second terminal apparatus, information for generating a 3D model that represents a participant who participates in an event in a virtual space using the first terminal apparatus, and
  the second terminal apparatus generates the 3D model in a form corresponding to a role of the participant in the event and outputs information for displaying an image obtained by rendering the virtual space in which the 3D model is arranged.

The terminal apparatus and the like according to the present disclosure can contribute to the convenience for participants in events in a virtual space.

BRIEF DESCRIPTION OF THE DRAWINGS

In the accompanying drawings:
FIG. 4 is a diagram illustrating an example of setting information;
FIG. 5A is a flowchart illustrating an example of operations of a terminal apparatus;
FIG. 5B is a flowchart illustrating an example of operations of a terminal apparatus;
FIG. 8A is a flowchart illustrating an example of operations of a terminal apparatus in a variation;
FIG. 8B is a flowchart illustrating an example of operations of a terminal apparatus in a variation.

DETAILED DESCRIPTION

Embodiments are described below.

Figure 1:
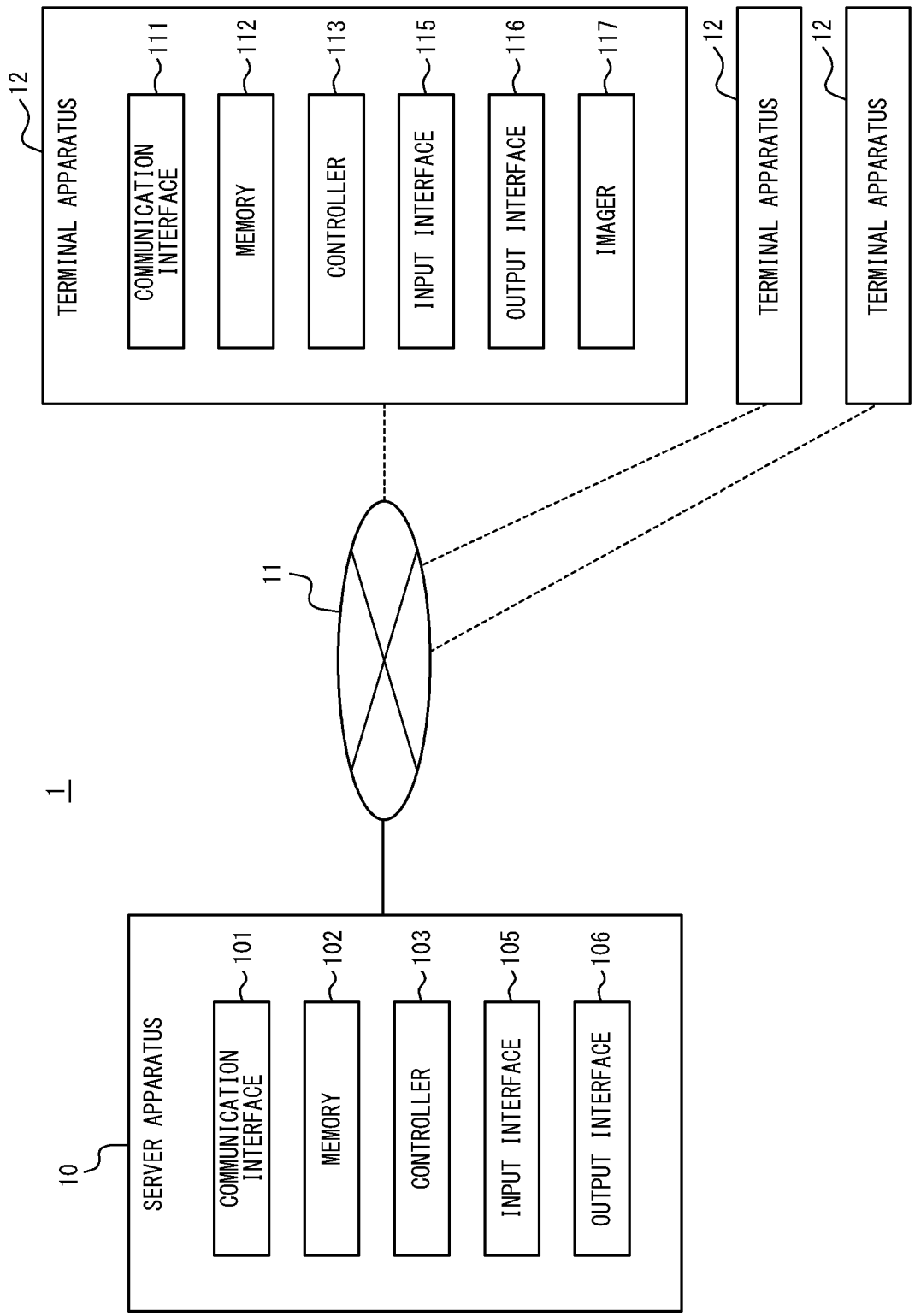
FIG. 1 is a diagram illustrating an example configuration of a virtual event provision system.

FIG. 1 is a diagram illustrating an example configuration of a virtual event provision system 1 in an embodiment. The virtual event provision system 1 is a system for providing events in a virtual space, i.e., virtual events, in which users can participate using terminal apparatuses. A virtual event is an event in which a plurality of participants communicates information by speech or the like in a virtual space, and each participant is represented by a 3D model. The virtual event provision system 1 includes a plurality of terminal apparatuses 12 and a server apparatus 10 that are communicably connected to each other via a network 11.

The server apparatus 10 is, for example, a server computer that belongs to a cloud computing system or other computing system and functions as a server that implements various functions. The server apparatus 10 may be configured by two or more server computers that are communicably connected to each other and operate in cooperation. The server apparatus 10 transmits and receives, and performs information processing on, information necessary to provide virtual events.

Each terminal apparatus 12 is an information processing apparatus provided with communication functions and is used by a user (participant) who participates in a virtual event provided by the server apparatus 10. The terminal apparatus 12 is, for example, an information processing terminal, such as a smartphone or a tablet terminal, or an information processing apparatus, such as a personal computer.

The network 11 may, for example, be the Internet or may include an ad hoc network, a Local Area Network (LAN), a metropolitan area network (MAN), other networks, or any combination thereof.

In the present embodiment, the terminal apparatus 12 includes a communication interface 111 and a controller 113. The controller 113 receives, from another terminal apparatus 12, information for generating a 3D model that represents a participant who participates in an event in a virtual space using the other terminal apparatus 12, generates the 3D model in a form corresponding to a role of the participant in the event, and outputs information for displaying an image obtained by rendering the virtual space in which the 3D model is arranged. By varying the form of the 3D models representing the participants according to the degree of importance of their roles, each participant can visually recognize the roles of other participants in the virtual event, making it easier to focus attention on participants with highly important roles. This can contribute to the convenience for participants.

Respective configurations of the server apparatus 10 and the terminal apparatuses 12 are described in detail.

The server apparatus 10 includes a communication interface 101, a memory 102, a controller 103, an input interface 105, and an output interface 106. These configurations are appropriately arranged on two or more computers in a case in which the server apparatus 10 is configured by two or more server computers.

The communication interface 101 includes one or more interfaces for communication. The interface for communication is, for example, a LAN interface. The communication interface 101 receives information to be used for the operations of the server apparatus 10 and transmits information obtained by the operations of the server apparatus 10. The server apparatus 10 is connected to the network 11 by the communication interface 101 and communicates information with the terminal apparatuses 12 via the network 11.

The memory 102 includes, for example, one or more semiconductor memories, one or more magnetic memories, one or more optical memories, or a combination of at least two of these types, to function as main memory, auxiliary memory, or cache memory. The semiconductor memory is, for example, Random Access Memory (RAM) or Read Only Memory (ROM). The RAM is, for example, Static RAM (SRAM) or Dynamic RAM (DRAM). The ROM is, for example, Electrically Erasable Programmable ROM (EEPROM). The memory 102 stores information to be used for the operations of the server apparatus 10 and information obtained by the operations of the server apparatus 10.

The controller 103 includes one or more processors, one or more dedicated circuits, or a combination thereof. The processor is a general purpose processor, such as a central processing unit (CPU), or a dedicated processor, such as a graphics processing unit (GPU), specialized for a particular process. The dedicated circuit is, for example, a field-programmable gate array (FPGA), an application specific integrated circuit (ASIC), or the like. The controller 103 executes information processing related to operations of the server apparatus 10 while controlling components of the server apparatus 10.

The input interface 105 includes one or more interfaces for input. The interface for input is, for example, a physical key, a capacitive key, a pointing device, a touch screen integrally provided with a display, or a microphone that receives audio input. The input interface 105 accepts operations to input information used for operation of the server apparatus 10 and transmits the inputted information to the controller 103.

The output interface 106 includes one or more interfaces for output. The interface for output is, for example, a display or a speaker. The display is, for example, a liquid crystal display (LCD) or an organic electro-luminescent (EL) display. The output interface 106 outputs information obtained by the operations of the server apparatus 10.

The functions of the server apparatus 10 are realized by a processor included in the controller 103 executing a control program. The control program is a program for causing a computer to function as the server apparatus 10. Some or all of the functions of the server apparatus 10 may be realized by a dedicated circuit included in the controller 103. The control program may be stored on a non-transitory recording/storage medium readable by the server apparatus 10 and be read from the medium by the server apparatus 10.

Each terminal apparatus 12 includes a communication interface 111, a memory 112, a controller 113, an input interface 115, an output interface 116, and an imager 117.

The communication interface 111 includes a communication module compliant with a wired or wireless LAN standard, a module compliant with a mobile communication standard such as LTE, 4G, or 5G, or the like. The terminal apparatus 12 connects to the network 11 via a nearby router apparatus or mobile communication base station using the communication interface 111 and communicates information with the server apparatus 10 and the like over the network 11.

The memory 112 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 112 functions as, for example, a main memory, an auxiliary memory, or a cache memory. The memory 112 stores information to be used for the operations of the controller 113 and information obtained by the operations of the controller 113.

The controller 113 has one or more general purpose processors such as CPUs or Micro Processing Units (MPUs) or one or more dedicated processors, such as GPUs, that are dedicated to specific processing. Alternatively, the controller 113 may have one or more dedicated circuits such as FPGAs or ASICs. The controller 113 is configured to perform overall control of the operations of the terminal apparatus 12 by operating according to the control/processing programs or operating according to operation procedures implemented in the form of circuits. The controller 113 then transmits and receives various types of information to and from the server apparatus 10 and the like via the communication interface 111 and executes the operations according to the present embodiment.

The input interface 115 includes one or more interfaces for input. The interface for input may include, for example, a physical key, a capacitive key, a pointing device, and/or a touch screen integrally provided with a display. The interface for input may also include a microphone that accepts audio input and a camera that captures images. The interface for input may further include a scanner, camera, or IC card reader that scans an image code. The input interface 115 accepts operations for inputting information to be used in the operations of the controller 113 and transmits the inputted information to the controller 113.

The output interface 116 includes one or more interfaces for output. The interface for output may include, for example, a display or a speaker. The display is, for example, an LCD or an organic EL display. The output interface 116 outputs information obtained by the operations of the controller 113.

The imager 117 includes a camera that captures an image of a subject using visible light and a distance measuring sensor that measures the distance to the subject to acquire a distance image. The camera captures a subject at, for example, 15 to 30 frames per second to produce a moving image formed by a series of captured images. Distance measurement sensors include ToF (Time Of Flight) cameras, LiDAR (Light Detection And Ranging), and stereo cameras and generate images of a subject that contain distance information. The imager 117 transmits the captured images and the distance images to the controller 113.

The functions of the controller 113 are realized by a processor included in the controller 113 executing a control program. The control program is a program for causing the processor to function as the controller 113. Some or all of the functions of the controller 113 may be realized by a dedicated circuit included in the controller 113. The control program may be stored on a non-transitory recording/storage medium readable by the terminal apparatus 12 and be read from the medium by the terminal apparatus 12.

In the present embodiment, the controller 113 acquires captured images and distance images of the user of the terminal apparatus 12, i.e., the participant, using the imager 117 and collects audio of the participant's speech using the microphone of the input interface 115. The controller 113 generates encoded information by encoding the captured images and distance images of the participant for generating a 3D model of the participant and speech information for reproducing the participant's speech and transmits the encoded information to the other terminal apparatus 12 via the server apparatus 10 using the communication interface 111. The controller 113 may perform any appropriate processing (such as resolution change and trimming) on the captured images and the like at the time of encoding. When the controller 113 receives encoded information transmitted from the other terminal apparatus 12 via the server apparatus 10 using the communication interface 111, the controller 113 decodes the encoded information. The controller 113 then uses the decoded information to generate a 3D model representing the other participant who uses the other terminal apparatus 12 and places the 3D model in the virtual space. The controller 113 may further generate a 3D model of the participant and place the 3D model in the virtual space. In generating the 3D model, the controller 113 generates a polygon model using the distance images of the other participant and applies texture mapping to the polygon model using the captured images of the other participant, thereby generating the 3D model of the other participant. This example is not limiting, however, and any method can be used to generate the 3D model. When the controller 113 generates virtual space images for output, the virtual space image including a 3D model from a predetermined viewpoint in the virtual space, the output interface 116 displays the virtual space images and outputs speech. These operations of the controller 113 and the like enable the participant of the terminal apparatus 12 to participate in the virtual event and talk with other participants in real time.

Figure 2:
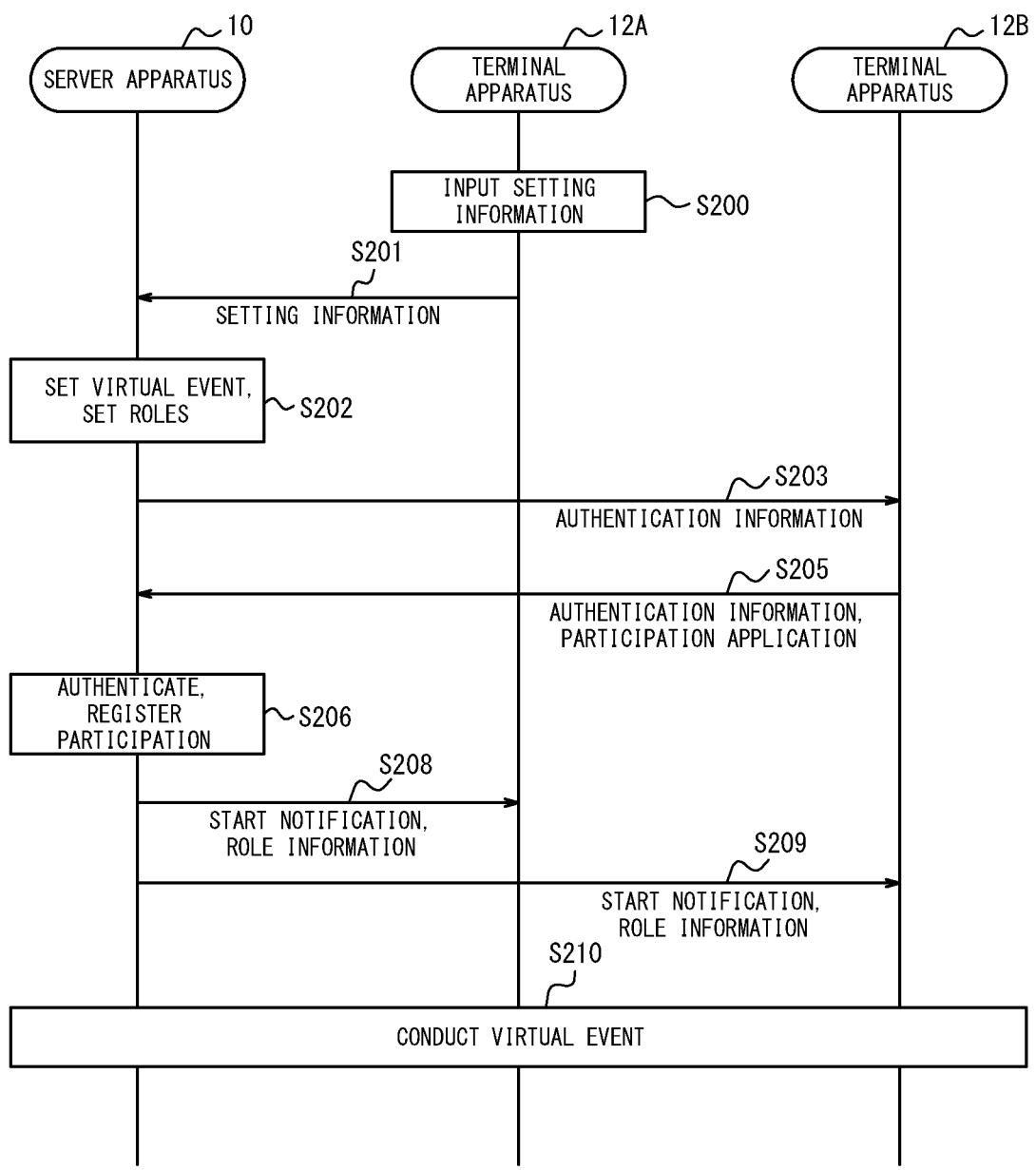
FIG. 2 is a sequence diagram illustrating an example of operations of the virtual event provision system.

FIG. 2 is a sequence diagram illustrating the operating procedures of the virtual event provision system 1. This sequence diagram illustrates the steps in the coordinated operation of the server apparatus 10 and the plurality of terminal apparatuses 12 (referred to as the terminal apparatus 12A and 12B when distinguishing therebetween). The terminal apparatus 12A is used by the administrator/participant (participant A) of the virtual event. The terminal apparatus 12B is used by a participant other than the administrator (participant B). Although the operating procedures by one terminal apparatus 12B are illustrated here, these operating procedures may be performed by each of a plurality of terminal apparatuses 12B.

The steps pertaining to the various information processing by the server apparatus 10 and the terminal apparatuses 12 in FIG. 2 are performed by the respective controllers 103 and 113. The steps pertaining to transmitting and receiving various types of information to and from the server apparatus 10 and the terminal apparatuses 12 are performed by the respective controllers 103 and 113 transmitting and receiving information to and from each other via the respective communication interfaces 101 and 111. In the server apparatus 10 and the terminal apparatuses 12, the respective controllers 103 and 113 appropriately store the information that is transmitted and received in the respective memories 102 and 112. Furthermore, the controller 113 of the terminal apparatus 12 accepts input of various types of information with the input interface 115 and outputs various types of information with the output interface 116.

In step S200, the terminal apparatus 12A accepts input of virtual event setting information by participant A. The setting information includes the type of virtual event and the role of the participants in the virtual event. In step S201, the terminal apparatus 12A then transmits the setting information to the server apparatus 10. The server apparatus 10 receives the information transmitted from the terminal apparatus 12A. For example, the terminal apparatus 12A accesses a site provided by the server apparatus 10 for conducting a virtual event, acquires an input screen for setting information, and displays the input screen to participant A. Then, once participant A inputs the setting information on the input screen, the setting information is transmitted to the server apparatus 10.

Figure 3:
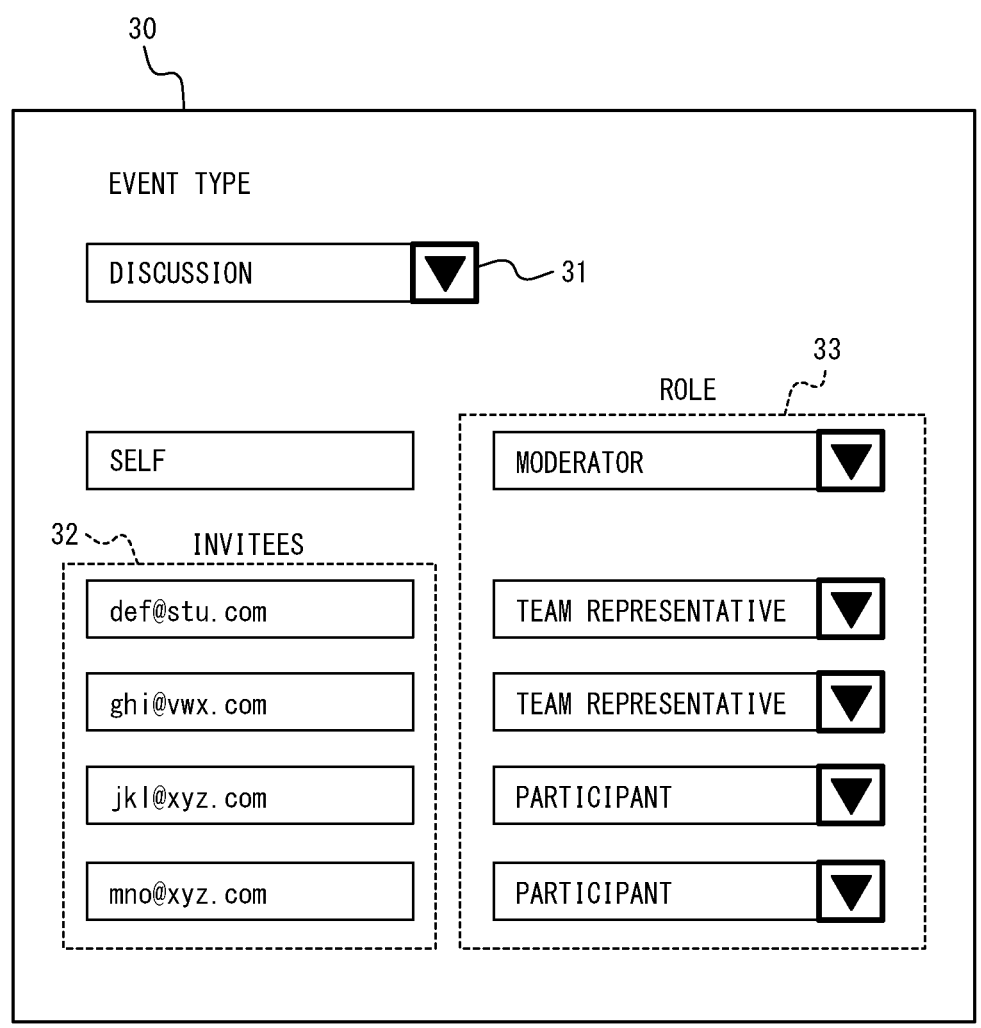
FIG. 3 is a diagram illustrating an example of an input screen for setting information.

FIG. 3 illustrates an example of the input screen for the setting information. The input screen 30 includes an input field 31 for selecting the event type, an input field 32 for the e-mail addresses of other participants to be invited to the event, and an input field 33 for the roles to be set for each participant in the event. The input fields 31 and 33 display choices and prompt participant A to make a selection, for example. Participant A selects the desired value from among event types 41. Participant A also inputs the e-mail address of participant B, who is to be invited to the event, in the input field 32 and selects the role to be assigned to participant B from the corresponding input field 33. Furthermore, participant A selects his own role in the input field 33. As illustrated here, each role may also be associated with a degree of importance that is appropriately set in advance.

FIG. 4 illustrates examples of event types, roles, and degrees of importance of roles. A table 40 includes event types 41, roles 42, and degrees of importance 43 as information items. The server apparatus 10 stores such a table 40 in the memory 102 in advance.

The event type 41 takes values such as "discussion", "presentation", and "entertainment", for example. The categories of the event type 41 are examples of categories based on the form of information exchange between participants in the virtual event. For example, a "discussion" includes forms of opinion and information exchange with a relatively clear oppositional structure, such as various discussions and debates in government, law, and business. A "presentation" includes forms of communication of information from one or a relatively small number of presenters to a relatively large audience, such as business presentations, business/education classes, lectures, conference presentations, and music/art performances. "Entertainment" includes round-table discussions, get-togethers, and other forms of relatively irregular exchange of opinion and information among participants. The event type 41 may take values other than the examples illustrated here.

The values of the role 42 are different for each value of the event type 41, e.g., "discussion", "presentation", and "entertainment". A degree of importance 43 is then associated with each value of the role 42. For example, the values of the role 42 that correspond to a "discussion" are "moderator", "team representative", and "team member", and the corresponding values of the degree of importance 43 are "medium", "high", and "low", respectively. The values of the role 42 that correspond to "presentation" are "presenter", "MC" and "audience", and the corresponding values of the degree of importance 43 are "high", "medium", and "low", respectively. The values of the role 42 that correspond to "entertainment" are "host", "assistant" and "guest", and the corresponding values of the degree of importance 43 are "high", "low", and "medium", respectively. These combinations of the value of the role 42 and the value of the degree of importance 43 are only non-limiting examples.

On the input screen 30, participant A selects the appropriate values for the event type 41, role 42, and degree of importance 43 in the table 40 to input the setting information.

Returning to FIG. 2, in step S202, the server apparatus 10 sets up a virtual event based on the setting information and sets the roles for the prospective participants in the virtual event.

In step S203, the server apparatus 10 transmits authentication information to the terminal apparatus 12B. The authentication information is information used to identify and authenticate participant B who uses the terminal apparatus 12B, i.e., information such as an ID and passcode used when participating in a virtual event. Such information is, for example, transmitted as an e-mail attachment. The terminal apparatus 12B receives the information transmitted from the server apparatus 10.

In step S205, the terminal apparatus 12B transmits the authentication information received from the server apparatus 10 and information on a participation application to the server apparatus 10. Participant B operates the terminal apparatus 12B and applies to participate in the virtual event using the authentication information transmitted by the server apparatus 10. For example, the terminal apparatus 12B accesses the site provided by the server apparatus 10 for the virtual event, acquires the input screen for the authentication information and the information on the participation application, and displays the input screen to participant B. The terminal apparatus 12B then accepts all the information inputted by participant B and transmits the information to the server apparatus 10.

In step S206, the server apparatus 10 performs authentication on participant B and sets participant B's role, thereby completing registration for participation. The identification information for the terminal apparatus 12B, the identification information for participant B, and information on the role and degree of importance for participant B are stored in association in the memory 102.

In steps S208 and S209, the server apparatus 10 transmits an event start notification and role information to the terminal apparatuses 12A and 12B. The role information includes information on the role and degree of importance of both Participant A and Participant B. Upon receiving the information transmitted from the server apparatus 10 and storing the information in the memory 112, the terminal apparatuses 12A and 12B begin the imaging and collection of audio of speech for participant A and participant B, respectively.

In step S210, a virtual event is conducted by the terminal apparatuses 12A and 12B via the server apparatus 10. The terminal apparatus 12A and 12B transmit and receive information for generating 3D models representing Participant A and Participant B, respectively, and information on speech to each other via the server apparatus 10. The terminal apparatuses 12A and 12B output images of the virtual event, including the 3D model of the other participants, and speech of the other participants to participant A and participant B, respectively.

FIGS. 5A and 5B are flowcharts illustrating the operating procedures of the terminal apparatus 12 for conducting a virtual event.

FIG. 5A relates to the operating procedures of the controller 113 when each terminal apparatus 12 transmits information for generating a 3D model of the participant who uses that terminal apparatus 12.

In step S501, the controller 113 retrieves the role information. The controller 113 retrieves the role information received from the server apparatus 10 and stored in the memory 112 and retrieves information on the role of the participant and the corresponding degree of importance.

In step S502, the controller 113 determines the form of the 3D model representing the participant. The controller 113 determines the form of the 3D model according to the degree of importance of the participant's role.

For example, the controller 113 determines the number of polygons for generating a 3D model of the participant according to the degree of importance of the participant's role. Specifically, the controller 113 decreases the number of polygons for generating the 3D model as the degree of importance of the role is lower. For example, information on the number of polygons in three sequentially decreasing levels corresponding to a "high", "medium", and "low" degree of importance of the role is stored in the memory 112 in advance, and the controller 113 reads the number of polygons corresponding to the degree of importance of the participant's role. The controller 113 may dynamically adjust the number of polygons, according to the processing load and communication speed, within a range of numbers of polygons set in steps according to the degree of importance of the role.

For example, the controller 113 determines the thickness of the 3D model of the participant in a predetermined axial direction according to the degree of importance of the participant's role. Specifically, the controller 113 reduces the thickness in the optical axis direction at the time of imaging the participant as the degree of importance of the role is lower. For example, information on three sequentially decreasing thicknesses corresponding to a "high", "medium", and "low" degree of importance of the role is stored in the memory 112 in advance, and the controller 113 reads the thickness corresponding to the degree of importance of each participant's role.

In step S503, the controller 113 captures visible light images and acquires distance images of the participant at an appropriately set frame rate using the imager 117 and collects audio of the participant's speech using the input interface 115. The controller 113 acquires the images captured by visible light and the distance images from the imager 117 and the speech information from the input interface 115.

In step S504, based on the captured images and the distance images, the controller 113 generates the 3D model information necessary for generating a 3D model of the participant in the form determined in step S502. The 3D model information is generated by selecting, from the captured images and distance images, information for constructing the 3D model with the determined number of polygons or thickness.

In step S505, the controller 113 encodes the 3D model information and speech information to generate encoded information.

In step S506, the controller 113 converts the encoded information into packets using the communication interface 111 and transmits the packets to the server apparatus 10.

When information inputted for an operation to suspend imaging and collection of audio or to exit the virtual event is acquired (Yes in S508), the controller 113 terminates the processing procedure in FIG. 5A, whereas while not acquiring information corresponding to an operation to suspend or exit (No in S508), the controller 113 executes steps S503 to S506. In this way, the terminal apparatus 12 transmits and receives, to and from the other terminal apparatus 12, information for generating the 3D model to represent the participant.

FIG. 5B relates to the operating procedures of the controller 113 when the terminal apparatus 12 outputs images of a virtual event, including the 3D model of the other participant, and the speech of the other participant based on information received from the other terminal apparatus 12. The procedures in FIG. 5B are performed when the controller 113 receives, via the server apparatus 10, a packet of video information transmitted by the other terminal apparatus 12 performing the procedures in FIG. 5A.

In step S510, the controller 113 decodes the encoded information contained in the packet to obtain the 3D model information and speech information.

Figure 6A:
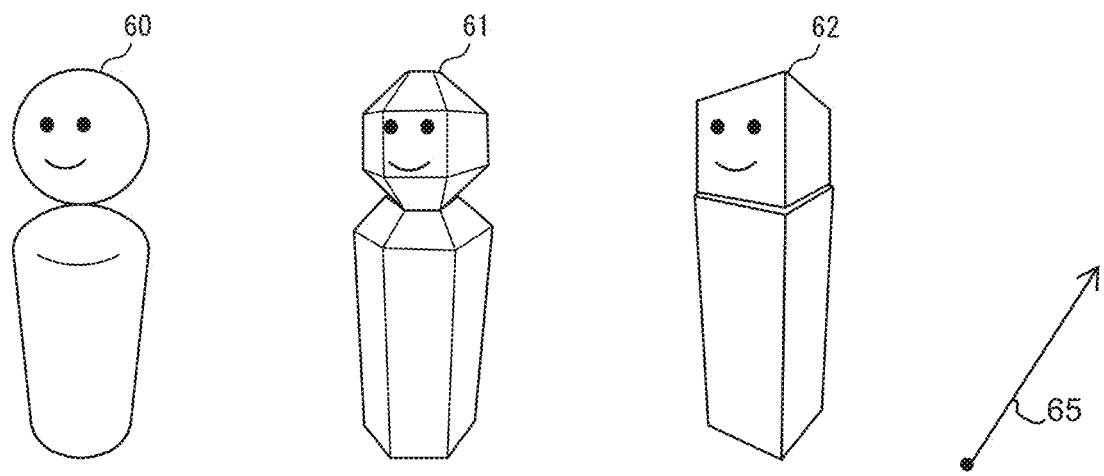
FIG. 6A is a diagram illustrating an example form of a 3D model.
Figure 6B:
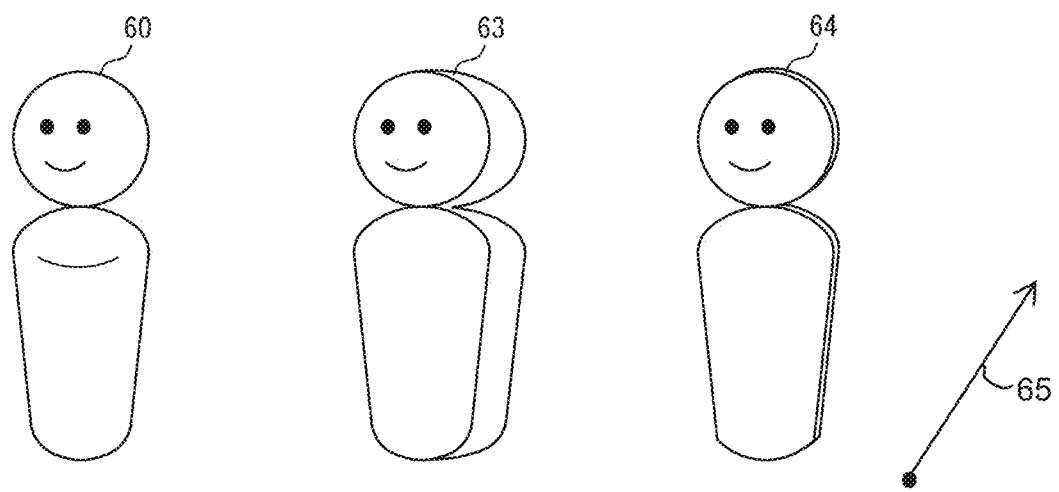
FIG. 6B is a diagram illustrating an example form of a 3D model.

In step S511, the controller 113 generates a 3D model representing the other participant based on the 3D model information. For example, a 3D model 60, 61, or 62 is generated, as illustrated schematically in FIG. 6A. For example, the 3D model 60 for a "high" degree of importance of the other participant's role is constructed by a large number of polygons to represent a detailed curved surface. The 3D model 61 for a "medium" degree of importance is generated with fewer polygons, and the 3D model 62 for a "low" degree of importance is generated with even fewer polygons, so that flat areas become more prominent due to the decrease in the number of polygons. In other words, as the degree of importance of the other participant's role is higher, a more realistic 3D model is generated. Alternatively, a 3D model 60, 63, or 64 may be generated, as illustrated schematically in FIG. 6B. For example, the 3D model 60 for a "high" degree of importance of the other participant is represented by a thickness in the optical axis direction 65 corresponding to the distance image. The 3D model 63 for a "medium" degree of importance is represented by a lower thickness in the optical axis direction 65, and the 3D model 64 for a "low" degree of importance is represented by an even lower thickness in the optical axis direction 65. The controller 113 may increase the transparency of the 3D model as the thickness is reduced. In this way, the 3D model becomes thinner and more transparent as the degree of importance is lower. As the degree of importance of the participant's role is higher, the 3D model is thus generated to be more realistic and eye-catching.

In step S512, the controller 113 generates and places a 3D model representing the other participant in the virtual space where the virtual event is held. Information on the coordinates of the virtual space for each event type and information on the coordinates at which the 3D models should be placed according to the roles of the participants are stored in the memory 112 in advance. The controller 113 selects the virtual space corresponding to the event type identified in the setting information. The controller 113 places the generated 3D model at the coordinates in the virtual space corresponding to the role of the other participant.

In step S513, the controller 113 renders and generates a virtual space image in which the 3D model placed in the virtual space is captured from a virtual viewpoint. The virtual viewpoint is that of the participant.

Alternatively, the controller 113 may generate a 3D model representing the participant in step S512 and render a virtual space image, in step S513, captured from a virtual viewpoint so as also to include the 3D model of the participant.

Figure 7A:
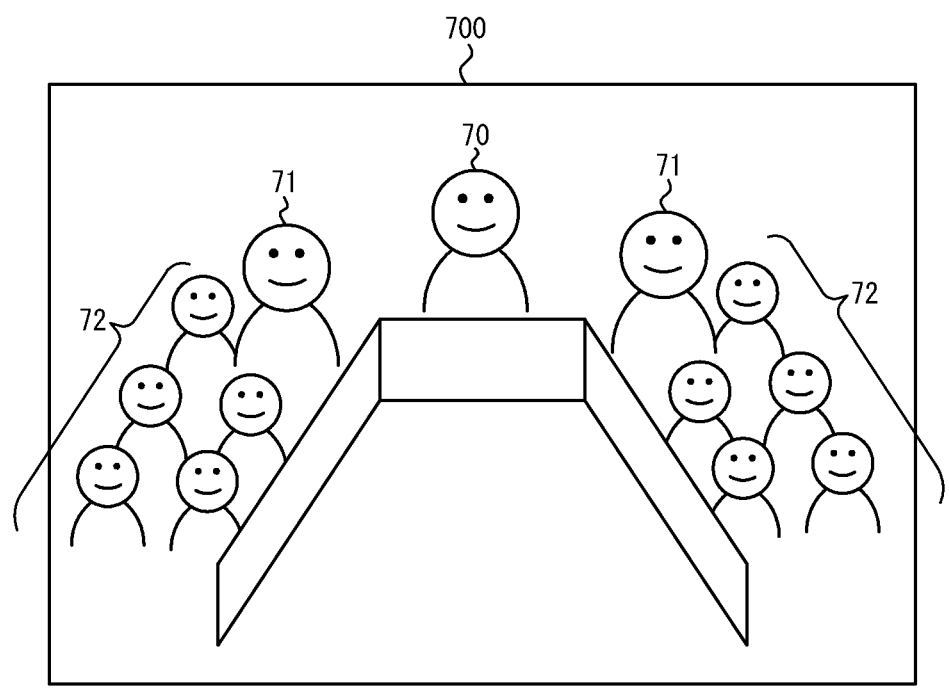
FIG. 7A is a diagram illustrating an example of a virtual space image.
Figure 7B:
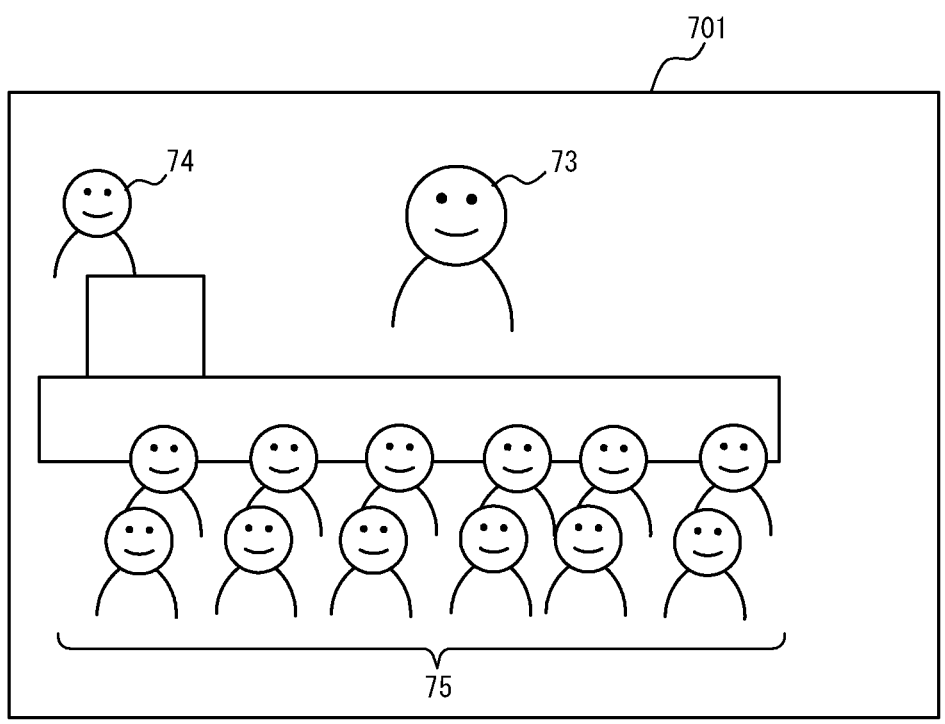
FIG. 7B is a diagram illustrating an example of a virtual space image.
Figure 7C:
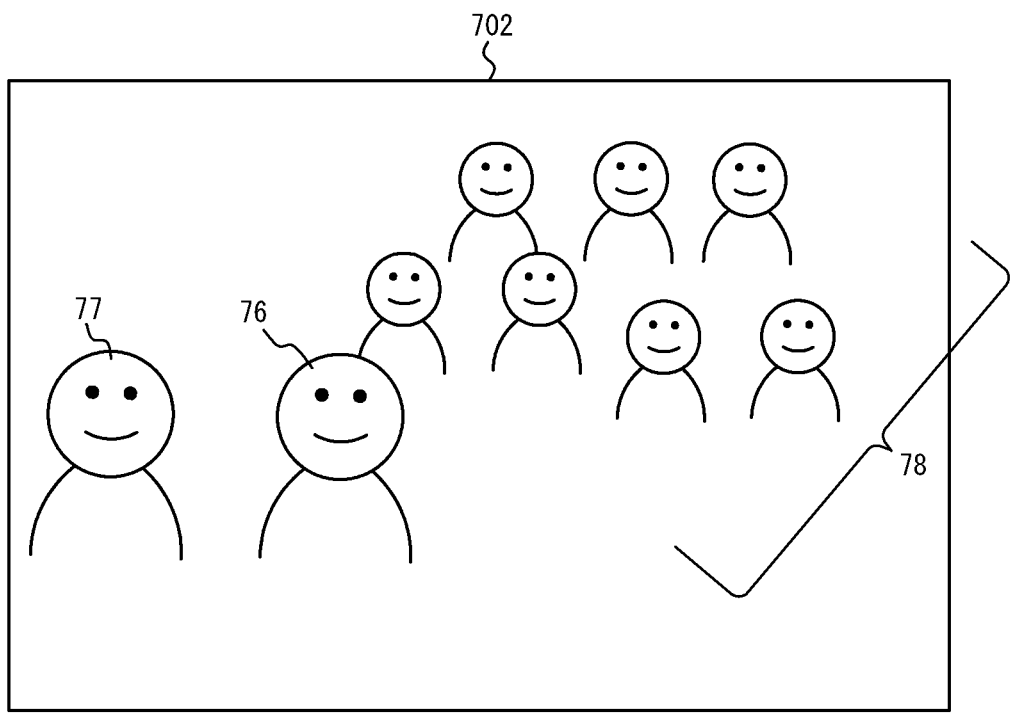
FIG. 7C is a diagram illustrating an example of a virtual space image.

FIGS. 7A to 7C illustrate examples of virtual space images. Here, the 3D models are simplified and displayed schematically, but each 3D model is generated in a form according to the corresponding role.

FIG. 7A is a diagram illustrating an example of a virtual space image. A virtual space image 700 is an example of a schematic captured image of a virtual event, whose type is discussion, and includes 3D models 70 to 72 representing the participants. The 3D model 70 in the center is a 3D model representing a participant assigned the role of moderator. The 3D models 71 and 72, which are placed on teams to the left and right, are 3D models representing the participants assigned the roles of team representative and team member, respectively. The 3D models 70 to 72 exhibit a form corresponding to the degree of importance of each participant's role.

FIG. 7B is a diagram illustrating another example of a virtual space image. A virtual space image 701 is an example of a schematic captured image of a virtual event, whose type is presentation, and includes 3D models 73 to 75 representing the participants. The 3D model 73 on the stage is a 3D model representing a participant assigned the role of presenter. The 3D model 74 on the side of the stage is a 3D model representing a participant assigned the role of MC. The 3D model 75 below the stage is a 3D model representing a participant assigned the role of audience. The 3D models 73 to 75 exhibit a form corresponding to the degree of importance of each participant's role.

FIG. 7C is a diagram illustrating yet another example of a virtual space image. A virtual space image 702 is an example of a schematic captured image of a virtual event, whose type is entertainment, and includes 3D models 76 to 78. The 3D model 76 at the front and center represents a participant assigned the role of host. The 3D model 77 at the front to the side represents a participant assigned the role of assistant. The 3D model 78 in the back represents a participant assigned the role of guest. The 3D models 76 to 78 exhibit a form corresponding to the degree of importance of each participant's role.

Returning to FIG. 5B, in step S514, the controller 113 displays the virtual space images and outputs speech using the output interface 116. In other words, the controller 113 outputs information to the output interface 116 for displaying images of an events in which 3D models are placed in a virtual space, and the output interface 116 displays the virtual space images and outputs speech.

The controller 113 performs steps S511 to S514 each time the controller 113 receives a packet of encoded information from the other terminal apparatus 12. In this way, the participant can listen to the speech of another participant while watching a video of virtual space images that include a 3D model of the other participant or 3D models of the other participant and the participant. At this time, visual recognition of the form of the 3D model corresponding to the degree of importance of the participant's role makes it easier to focus attention on participants whose role has a high degree of importance. This can contribute to the convenience for participants.

FIGS. 8A and 8B are flowcharts respectively corresponding to variations of FIGS. 5A and 5B. In FIGS. 8A and 8B, each terminal apparatus 12 transmits the captured images, distance images, and speech information of the corresponding participant. Each terminal apparatus 12 then generates a 3D model in a form corresponding to the degree of importance of the role of the other participant using the captured images and distance images transmitted from the other terminal apparatus 12. In FIGS. 8A and 8B, the same steps as in FIGS. 5A and 5B are labeled identically, and explanations are omitted or simplified.

In FIG. 8A, upon determining the form of the 3D model representing the participant in step S502, the controller 113 transmits 3D model form information indicating the form of the 3D model in step S502'. After capturing images and collecting audio in step S503, the controller 113 encodes the captured images, distance images, and speech information in step S505' to generate encoded information to be transmitted in step S506.

In step S509 of FIG. 8B, the controller 113 receives the 3D model form information transmitted from the other terminal apparatus 12, stores this information in the memory 112, and also acquires the form of the 3D model representing the other participant who uses the other terminal apparatus 12. In step S510', the controller 113 decodes the encoded information transmitted from the other terminal apparatus to acquire the captured images, distance images, and speech information. Then, in generating the 3D model of the other participant in step S511, the controller 113 generates the 3D model in the form acquired in step S510. While continuing to acquire packets from the other terminal apparatus 12 (No in step S516), the controller 113 performs steps S510' to S514, and when the packets are finished (Yes in step S516), the controller 113 terminates the procedures in FIG. 8B.

The procedures in FIG. 5A, 5B or 8A, 8B can be adopted according to the processing performance and communication speed of the processors in the terminal apparatus 12 so as to distribute the load among the terminal apparatuses 12.

In another variation, the controller 113 can convert and output the sound pressure and frequency of the speech of participants whose roles have a low degree of importance. For example, the memory 112 stores information in advance indicating a degree of importance to serve as a standard for speech output. In the case of a degree of importance below the degree of importance serving as a standard, such as a "low" degree of importance, the controller 113 performs a conversion process on the participant's speech information and outputs speech output information for outputting the converted speech. For example, the frequency and sound pressure are adjusted so that the speech mimics the sound that a person makes when inhaling helium gas. The output interface 116 then receives the speech output information and outputs the converted speech. In this way, it becomes easier to distinguish speech by participants whose role has a higher degree of importance from other speech, thereby improving convenience for participants.

Figure 9:
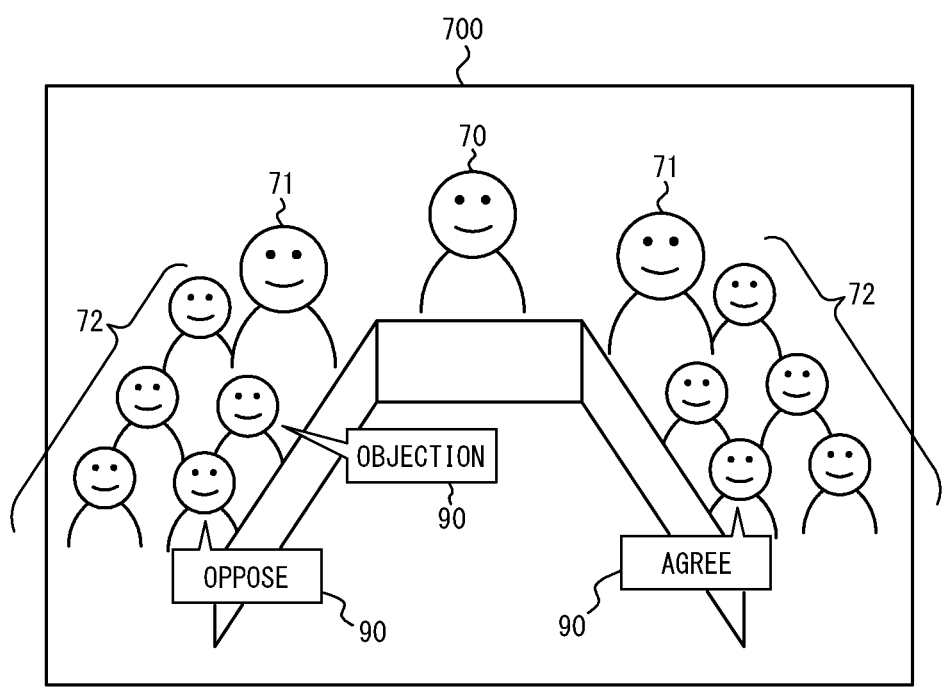
FIG. 9 is a diagram illustrating an example of a virtual space image in a variation.

In yet another variation, the controller 113 can display text corresponding to the speech instead of outputting the speech of a participant whose role has a low degree of importance. For example, the memory 112 stores information in advance indicating a degree of importance to serve as a standard for speech output. In the case of a degree of importance below the degree of importance serving as a standard, such as a "low" degree of importance, the controller 113 performs a speech recognition process on the participant's speech information and generates text corresponding to the speech. Instead of the speech output information, the controller 113 then outputs information for displaying the text corresponding to the speech. Specifically, the controller 113 places the text near the corresponding 3D model when generating the virtual space image. The controller 113 then outputs the virtual space image containing the text to the output interface 116. The output interface 116 then outputs the virtual space image. For example, as illustrated in FIG. 9, in a virtual space image 700 of a virtual event that is a discussion, text 90 indicating the content of speech is placed and displayed near the 3D model 72 that represents a participant in the role of a team member, i.e., a participant corresponding to a "low" degree of importance. The controller 113 may generate text from the participant's speech according to the degree of importance of the participant's role, encode information that includes the text together with the 3D model, and transmit the information to the other terminal apparatus 12. The controller 113 may also generate text from the other participant's speech, encoded and transmitted from the other terminal apparatus 12, according to the degree of importance of the other participant's role and output information for outputting the generated text. In this way, it becomes easier to concentrate on the speech by participants whose role has a higher degree of importance, thereby improving convenience for participants.

The form of the 3D model has been described as being determined using the degree of importance of the participant's role as a scale. However, the case of associating the form of the 3D model appropriately with each role is also included in the present embodiment. The number of polygons to generate the 3D model and the thickness in the optical axis direction are not limited to three steps as in the above example but may instead be two steps, or four or more steps. Different roles may be associated with the same number of polygons or thickness.

While embodiments have been described with reference to the drawings and examples, it should be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

The invention claimed is:

1. A terminal apparatus comprising:
a communication interface; and
a controller configured to communicate using the communication interface, wherein the controller is further configured to:
receive, from another terminal apparatus, information for generating a 3D model that represents a participant who participates in an event in a virtual space using the another terminal apparatus, the information for generating the 3D model specifying a form corresponding to a role of the participant in the event from a plurality of predetermined forms,
receive, from the another terminal apparatus, information on a captured image of the participant;
generate, based on the captured image of the participant, the 3D model in the form corresponding to the role of the participant in the event, the form being a number of polygons for generating the 3D model, the number of polygons determined based on the role of the participant,
output information for displaying an image obtained by rendering the virtual space in which the 3D model is arranged,
receive information on speech of the participant from the another terminal apparatus,
output information for outputting the speech of the participant, based on determining that the role of the participant is equal to or higher than a predetermined degree of importance, and
based on determining that the role of the participant is below the predetermined degree of importance, (i) convert a sound pressure and a frequency of the speech of the participant and output information for outputting the converted speech of the participant, or (ii) output information for displaying a text corresponding to the speech of the participant.

2. The terminal apparatus according to claim 1, wherein the form further includes a thickness of the 3D model in a predetermined direction.

3. The terminal apparatus according to claim 2, wherein the controller generates the 3D model in a first form from the plurality of predetermined forms based on determining the role is a first role and in a second form from the plurality of predetermined forms based on determining the role is a second role that has a higher degree of importance than the first role, the number of polygons being larger in the second form than in the first form.

4. The terminal apparatus according to claim 2, wherein the controller generates the 3D model in a first form from the plurality of predetermined forms based on determining the role is a first role and in a second form from the plurality of predetermined forms based on determining the role is a second role that has a higher degree of importance than the first role, the thickness of the 3D model being larger in the second form than in the first form.

5. The terminal apparatus according to claim 1, wherein based on determining that the role of the participant is below the predetermined degree of importance, the controller converts the sound pressure and the frequency of the speech of the participant and outputs the information for outputting the converted speech of the participant.

6. The terminal apparatus according to claim 1, wherein based on determining that the role of the participant is below the predetermined degree of importance, the controller outputs the information for displaying the text.

7. A method of operating a terminal apparatus comprising a communication interface and a controller configured to communicate using the communication interface, the method comprising:
receiving, by the controller, from another terminal apparatus, information for generating a 3D model that represents a participant who participates in an event in a virtual space using the another terminal apparatus, the information for generating the 3D model specifying a form corresponding to a role of the participant in the event from a plurality of predetermined forms;
receiving, from the another terminal apparatus, information on a captured image of the participant;
generating, based on the captured image of the participant, the 3D model in the form corresponding to the role of the participant in the event, the form being a number of polygons for generating the 3D model, the number of polygons determined based on the role of the participant;
outputting information for displaying an image obtained by rendering the virtual space in which the 3D model is arranged;
receiving information on speech of the participant from the another terminal apparatus;
outputting information for outputting the speech of the participant, based on determining that the role of the participant is equal to or higher than a predetermined degree of importance; and
based on determining that the role of the participant is below the predetermined degree of importance, (i) converting a sound pressure and a frequency of the speech of the participant and outputting information for outputting the converted speech of the participant, or (ii) outputting information for displaying a text corresponding to the speech of the participant.

8. The method of operating according to claim 7, wherein the form further includes a thickness of the 3D model in a predetermined direction.

9. The method of operating according to claim 8, wherein the generating the 3D model further comprises:
generating, by the controller, the 3D model in a first form from the plurality of predetermined forms based on determining the role is a first role and in a second form from the plurality of predetermined forms based on determining the role is a second role that has a higher degree of importance than the first role, the number of polygons being larger in the second form than in the first form.

10. The method of operating according to claim 8, wherein the generating the 3D model further comprises:
generating, by the controller, the 3D model in a first form from the plurality of predetermined forms based on determining the role is a first role and in a second form from the plurality of predetermined forms based on determining the role is a second role that has a higher degree of importance than the first role, the thickness of the 3D model being larger in the second form than in the first form.

11. The method of operating according to claim 7, wherein based on determining that the role of the participant is below the predetermined degree of importance, the converting the sound pressure and the frequency of the speech of the participant and the outputting the information for outputting the converted speech are performed.

12. The method of operating according to claim 7, wherein based on determining that the role of the participant is below the predetermined degree of importance, the outputting the information for displaying the text is performed.

13. A system comprising:
a server apparatus; and
a plurality of terminal apparatuses configured to communicate via the server apparatus, wherein
a first terminal apparatus from the plurality of terminal apparatuses is configured to transmit, to a second terminal apparatus, information for generating a 3D model that represents a participant who participates in an event in a virtual space using the first terminal apparatus, the information for generating the 3D model specifying a form corresponding to a role of the participant in the event from a plurality of predetermined forms, and
the second terminal apparatus from the plurality of terminal apparatuses is configured to:
receive, from the first terminal apparatus, information on a captured image of the participant;
generate, based on the captured image of the participant, the 3D model in the form corresponding to the role of the participant in the event, the form being a number of polygons for generating the 3D model, the number of polygons determined based on the role of the participant;
output information for displaying an image obtained by rendering the virtual space in which the 3D model is arranged,
receive information on speech of the participant from the first terminal apparatus,
output information for outputting the speech of the participant, based on determining that the role of the participant is equal to or higher than a predetermined degree of importance, and
based on determining that the role of the participant is below the predetermined degree of importance, (i) convert a sound pressure and a frequency of the speech of the participant and output information for outputting the converted speech of the participant, or (ii) output information for displaying a text corresponding to the speech of the participant.

14. The system according to claim 13, wherein the form further includes a thickness of the 3D model in a predetermined direction.

15. The system according to claim 14, wherein the second terminal apparatus is further configured to generate the 3D model in a first form based on determining the role is a first role from the plurality of predetermined forms and in a second form from the plurality of predetermined forms based on determining the role is a second role that has a higher degree of importance than the first role, the number of polygons being larger in the second form than in the first form.

16. The system according to claim 14, wherein the second terminal apparatus is further configured to generate the 3D model in a first form from the plurality of predetermined forms based on determining the role is a first role and in a second form from the plurality of predetermined forms based on determining the role is a second role that has a higher degree of importance than the first role, the thickness of the 3D model being larger in the second form than in the first form.

17. The system according to claim 13, wherein based on determining that the role of the participant is below the predetermined degree of importance, the second terminal apparatus converts the sound pressure and the frequency of the speech of the participant and outputs the information for outputting the converted speech of the participant.

18. The system according to claim 13, wherein based on determining that the role of the participant is below the predetermined degree of importance, the second terminal apparatus outputs the information for displaying the text.

* * * * *